United States Patent
Knoedgen et al.

(10) Patent No.: US 7,155,119 B2
(45) Date of Patent: Dec. 26, 2006

(54) MULTI-PROCESSING OF A PICTURE TO SPEED UP MATHEMATICS AND CALCULATION FOR ONE PICTURE

(75) Inventors: Horst Knoedgen, Munich (DE); Dirk Huettmann, Baltmannsweiler (DE)

(73) Assignee: Dialog Imaging Systems GmbH, Kirchheim/Teck-Nabern (DE)

( * ) Notice: Subject to any disclaimer, the term of this patent is extended or adjusted under 35 U.S.C. 154(b) by 187 days.

(21) Appl. No.: 10/929,652

(22) Filed: Aug. 30, 2004

(65) Prior Publication Data
US 2006/0038893 A1      Feb. 23, 2006

(30) Foreign Application Priority Data
Aug. 17, 2004   (EP) .................................. 04368057

(51) Int. Cl.
  G03B 43/00         (2006.01)
  H04N 17/00         (2006.01)
(52) U.S. Cl. ........................ 396/429; 348/187
(58) Field of Classification Search ........ 348/177–179, 348/187, 188, 222.1; 396/439, 300, 429, 396/661
See application file for complete search history.

(56) References Cited

U.S. PATENT DOCUMENTS

| | | | |
|---|---|---|---|
| 4,298,944 A | 11/1981 | Stoub et al. ................. | 364/515 |
| 4,612,666 A | 9/1986 | King ........................... | 382/32 |
| 5,179,437 A | 1/1993 | Kawada et al. ............... | 358/10 |
| 5,467,128 A | 11/1995 | Yates et al. | |
| 5,649,258 A | 7/1997 | Bergstresser et al. ........ | 396/429 |
| 5,960,081 A * | 9/1999 | Vynne et al. ................ | 713/176 |
| 6,201,600 B1 | 3/2001 | Sites et al. ................... | 356/124 |
| 6,205,244 B1 * | 3/2001 | Bawolek et al. ............. | 382/162 |
| 6,219,443 B1 | 4/2001 | Lawrence .................... | 382/141 |
| 6,512,587 B1 | 1/2003 | Marcus et al. ............... | 356/497 |
| 6,701,002 B1 | 3/2004 | Karube | |
| 2002/0191973 A1 | 12/2002 | Hofer et al. ................... | 396/80 |
| 2003/0002749 A1 | 1/2003 | Vehvilainen ................. | 382/275 |
| 2003/0030648 A1 | 2/2003 | Baer ........................... | 345/589 |
| 2003/0142374 A1 | 7/2003 | Silverstein ................... | 358/504 |
| 2003/0146976 A1 | 8/2003 | Liu ........................... | 348/207.1 |
| 2004/0027456 A1 | 2/2004 | Pierce ......................... | 348/175 |
| 2004/0032496 A1 | 2/2004 | Ebenstein et al. ........... | 348/187 |

(Continued)

FOREIGN PATENT DOCUMENTS

EP   0679932   11/1995

(Continued)

OTHER PUBLICATIONS

Co-pending U.S. Appl. No. 10/417,317, filed Apr. 16, 2003, assigned to the same assignee, "Miniature Camera Module".

(Continued)

*Primary Examiner*—W. B. Perkey
(74) *Attorney, Agent, or Firm*—Saile Ackerman LLC; Stephen B. Ackerman

(57) ABSTRACT

A multi-processing unit reduces the time to compute parameters of a digital image to by the number of computers operating in the parallel. An image of a digital picture taken during a test of a digital camera module is portioned into N independent portions and each portion is stored into one of N memories. N processors compute test parameters of the image, where each processor works independently on a portion of the image and in parallel with the other processors. The serial computational content of the image is zero allowing a speed-up of the multiprocessing unit to be N with respect to the running the entire computation on a single processor.

35 Claims, 5 Drawing Sheets

U.S. PATENT DOCUMENTS

2006/0077259 A1* 4/2006 Knoedgen et al. .......... 348/187

FOREIGN PATENT DOCUMENTS

| EP | 1286553 | 2/2003 |
| EP | 1 348 996 A1 | 10/2003 |
| EP | 1382194 A1 | 1/2004 |
| EP | 1389878 A1 | 2/2004 |
| JP | 03099376 A | 4/1991 |
| JP | 2001292461 | 10/2001 |
| JP | 2002077955 | 3/2002 |
| JP | 2002232918 | 8/2002 |
| JP | 2002290994 | 10/2002 |
| JP | 2003101823 | 4/2003 |
| JP | 2003157425 | 5/2003 |
| JP | 2003179949 | 6/2003 |
| JP | 2003219436 | 7/2003 |
| JP | 2003259126 | 9/2003 |
| KR | 10 20030052216 | 6/2003 |
| WO | 2002102060 | 12/2002 |

OTHER PUBLICATIONS

Co-pending U.S. Appl. No. 10/434,743, filed May 8, 2003, assigned to the same assignee, "Test System for Camera Modules".

Co-pending U.S. Appl. No. 10/930,351, filed Aug. 31, 2004, to the same assignee.

Co-pending U.S. Appl. No. 10/929,651, Aug. 30, 2004, to the same assignee.

Co-pending U.S. Appl. No. 10/930,353, filed Aug. 31, 2004, to the same assignee.

Co-pending U.S. Appl. No. 10/929,300, filed Aug. 30, 2004, to the same assignee.

Co-pending U.S. Appl. No. 10/929,653, filed Aug. 30, 2004, to the same assignee.

* cited by examiner

MULTI-PROCESSING OF A PICTURE TO SPEED UP MATHEMATICS AND CALCULATION FOR ONE PICTURE

RELATED PATENT APPLICATION

This application is related to U.S. patent application, Ser. No. 10/930,351, filed on Aug. 31, 2004, and assigned to the same assignee as the present invention.

This application is related to U.S. patent application, Ser. No. 10/929,651, filed on Aug. 30, 2004, and assigned to the same assignee as the present invention.

This application is related to U.S. patent application, Ser. No. 10/930,353, filed on Aug. 31, 2004, and assigned to the same assignee as the present invention.

This application is related to U.S. patent application, Ser. No. 10/929,300, filed on Aug. 30, 2004, and assigned to the same assignee as the present invention.

This application is related to U.S. patent application, Ser. No. 10/929,653, filed on Aug. 30, 2004, and assigned to the same assignee as the present invention.

BACKGROUND OF THE INVENTION

1. Field of Invention

The present invention is related to computer multi-processing and in particular to parallel processing of picture data captured during a test of a digital camera module.

2. Description of Related Art

The digital camera is becoming a ubiquitous device. Not only are digital cameras replacing the traditional film camera, digital camera devices are being used in many other applications, such as small electronic devices, such as PDA (personal data assistant) and cellular phones. With the explosion of cellular phones, the ability to take a picture and then send that picture to another individual using a second cellular phone comes the need to produce inexpensive digital camera modules and efficiently test these modules in large quantities. This is further complicated by the many different module configurations that are emerging as a result of the many different application requirements, including fixed focus, manual focus and automatic focus as well as physical size. Some of these modules are very small and others have signal leads in the form of a flex filmstrip. The testing time for digital camera module, which can have mega-pixel capability, has traditionally been a relatively long process (approximately sixty seconds for a module with 0.3 megapixels) to insure the integrity and picture quality of the camera. Many computations performed on picture images are necessary to insure that the pixel elements of the digital camera module meet specifications. Quality testing at a low cost has become the utmost of importance. This necessitates a testing capability that is fast (including the computations that must be made) and insures the integrity and specification of the digital camera module while testing a large quantity of modules.

A patent application, Ser. No. 10/417,317 dated Apr. 16, 2003, is related to miniature cameras and their manufacturing methods that are used as built-in modules in hand held consumer electronics devices such as mobile phones and PDA's. In a second patent application, Ser. No. 10/434,743 dated May 8, 2003, a test system is described for digital camera modules used as built-in modules for consumer electronics, which performs electrical tests, adjustment of focus and sealing of the lens barrel with glue.

In addition there are a number of other prior art patents that are directed to testing of digital cameras: U.S. Ser. No. 20040032496A1 (Eberstein et al.) is directed to a method of camera calibration and quality testing; EP 1389878A1 (Bednarz et al.) is directed to a method of camera calibration and testing camera quality; U.S. Ser. No. 20040027456A1 (Pierce) directed to the use of calibration targets; EP 1382194A1 (Baer) is directed to dark current subtraction; JP 2003259126 (Keisuke) is directed to removing noise of an image; U.S. Ser. No. 20030146976A1 (Liu) is directed to a digital camera system enabling remote monitoring; JP 2003219436 (Fuminori) is directed to adjustment of a pixel shift camera; U.S. Ser. No. 2003142374 (Silverstein) is directed to calibrating output of an image output device; JP 2003179949 (Hidetoshi) is directed to a luminance level inspection apparatus; JP 2003157425 (Vehvilainen) is directed to improving image quality produced in a mobile imaging phone; JP 2003101823 (Kenichi) is directed to specifying a picture data area; EP 1286553 A2 (Baer) is directed to a method and apparatus for improving image quality; U.S. Ser. No. 20030030648 (Baer) is directed to a method and apparatus for improving image quality in digital cameras; U.S. Pat. No. 6,512,587 (Marcus et al.) is directed to measurement method and apparatus of an imager assembly; U.S. Ser. No. 20030002749 (Vehvilainen) is directed to a method and apparatus for improving image quality; U.S. Ser. No. 20020191973 A1 (Hofer et al.) is directed to a method and apparatus for focus error reduction; WO 2002102060 A1 (Baer) is directed to a method and apparatus for smear in digital images using a frame transfer sensor; JP 2002290994 (Hidetoshi) is directed to a method and apparatus to detect foreign matter on the surface of a lens; JP 200223918 (Yanshinao) is directed to an image inspection device and method for a camera module; JP 2002077955 (Keisuke) is directed to a method and apparatus for evaluating camera characteristics; JP 2001292461 (Keisuke) is directed to a system and method for evaluating a camera; U.S. Ser. No. 6219443 B1 (Lawrence) is directed to a method and apparatus for inspecting a display using a low resolution camera; U.S. Ser. No. 6201600B1 (Sites et al.) is directed to a method and apparatus for inspection of optically transmissive objects having a lens; U.S. Pat. No. 5,649,258 (Bergstresser et al.) is directed to an apparatus and testing of a camera; EP 0679932 B1 (Kobayashi et al.) is directed to testing an electronically controlled camera; U.S. Pat. No. 5,179,437 (Kawada et al.) is directed to an apparatus for color correction of image signals of a color television camera; JP 03099376 (Hiroshi) is directed to the quality of a display screen; U.S. Pat. No. 4,612,666 (King) is directed to a pattern recognition apparatus; and U.S. Pat. No. 4,298,944 Stoub et al.) is directed to a method and apparatus for distortion correction for scintillation cameras.

SUMMARY OF THE INVENTION

It is an objective of the present invention to provide a plurality of parallel processors, which operate separately on separate portions of a digital picture image taken by a digital camera module under test.

It is further an objective of the present invention to compute parameters of a digital picture image in a separate portion of the image independent of other portions of the image.

It is still further an objective of the present invention to speed up the computation time of a digital picture image by approximately the number of independent computer processors each operating on an independent portion of the digital picture image.

It is also further an objective of the present invention to synchronize a light source with a clock of a digital camera module under test to capture a picture image, separate the picture image into independent portions and store the independent portions into independent memories to be operated on by independent computer processors.

In the present invention a computational unit comprises N memories and N computer processors units (CPU), where N is an integer. The N memories and N CPU form a computational unit to compute image parameters of a test picture image taken by a digital camera module under test (MUT). A frame grabber synchronizes the clock of MUT with a fast light source to capture a picture image. The light source ranges in time from approximately one microsecond to one hundred milliseconds. The picture image is partitioned into N portions and coupled to the N memories by a frame grabber, which synchronizes the coupling of the N portions into the N memories. A first picture portion of the N picture portions is coupled to a first memory. A second picture portion of the N picture portions is coupled to a second memory. An Nth picture portion of the N picture portions is coupled to an N memory.

A first memory of the N memories is paired with a first CPU of the N CPU to operate on a first picture portion of N picture portions independent of the remaining N−1 picture portions. A second memory of the N memories is paired with a second of the N CPU to operate on a second picture portion of N picture portions independent of the remaining N−1 picture portions. An Nth memory of the N memory portions is paired with an Nth CPU of the N CPU to operate on an Nth picture portion of the N picture portions independent of the remaining N−1 picture portions. The N CPU, operating independently of the each other computes the image parameters of each of the N pictures portions independently of the other picture portions.

The time to process a job in a single processor is t=ts+tp, where ts=the time to process the serial content of a job and tp=the time to process the parallel content in a single processor. From parallel processing technology it is well known that the time to process a job in a parallel processor is t=ts+tp/N, where N=the number of parallel processors. Since the N picture portions are loaded into N separate memories in which the picture portions and the memories are independent of each other and since the N memory and N CPU combinations operate independent of each other, then ts=0, and the speed-up (SU) in the computation time of the N picture portions is SU=(ts+tp)/(ts+tp/N)=N. Therefore, the processing of the N picture portions by the N processors provides a reduction in the computational time by N, the number of processors that are operating simultaneously on the separate picture portions.

A plurality of frame grabbers can be used in which portions of a plurality of picture images are split and processed by a separate set of computer processing units. This separate set of computer processing units can comprise small computing units, i.e. PC's (personal computers), and/or additional NCPU. The picture image can be coupled into the memory by pixel allowing computation on pixels coupled to the memory while additional pixels of the picture image are being loaded in a video streaming fashion. The video streaming provides a capability to overlap the computation with the loading of the memory. A plurality of frame grabbers can be used to couple the video streaming of the picture image into the NCPU in a fashion where the plurality of frame grabbers and NCPU form a pipeline structure.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
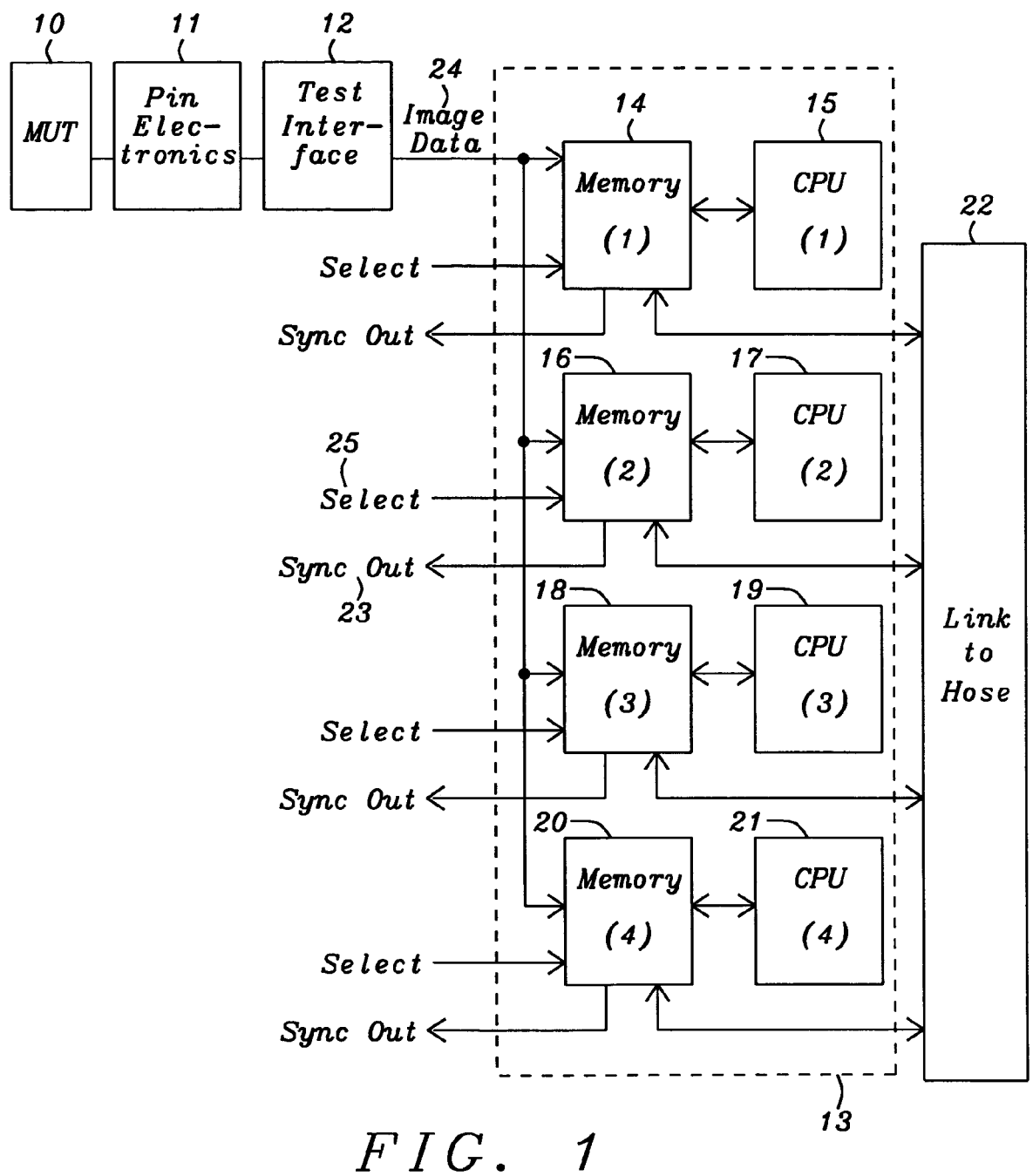
FIG. 1 is a block diagram of the parallel processing unit of the present invention.

In FIG. 1 is shown a computational unit 13 of the present invention for use in computing picture parameters of digital picture images captured by the digital camera module (MUT) 10. Image data 24 of a digital picture is coupled from the MUT 10 to the memories 14, 16, 18, and 20 of the computational unit 13 through pin electronics 11, connected to the signal pins of the MUT, and a test interface 12. The select 25 selects the memory into which image data 24 is to be stored. The sync out 23 of each memory 14, 16, 18 and 20 allows the image data 24 to be portioned between the memories, preferably in equal data amounts, by allowing each memory to be synchronized with a portion of the image data.

Each memory 14, 16, 18 and 20 has a field programmable gate array (FPGA) that controls the loading of the image data 24 into the memory and delivery of computed results by a link 22 to a host computer. Memory (1) 14 is coupled to a CPU (1) 15 and acts as a computational pair to operate on a first portion of a picture image stored in memory (1) 14. In like manner memory (2) 16 is coupled to CPU (2) 17 to operate on a second portion of the picture image stored in memory (2), memory (3) 18 is coupled to CPU (3) 19 to operate on a third portion of the picture image stored in memory (3), and memory (4) 20 is coupled to CPU (4) 21 to operate on a fourth portion of the picture image stored in memory (4).

Each memory 14, 16, 18 and 20 is loaded with a different portion of a picture image for computation by the respective CPU 15, 17, 19, and 21. Alternatively, each memory 14, 16, 18, 20 is loaded with a different picture using a different frame grabber such that a first frame grabber loads a first picture image into a first memory 14, a second frame grabber loads a second picture image into a second memory 16, a third frame grabber loads a third picture image into a third memory 18 and a fourth frame grabber loads a fourth picture image into a fourth memory 20. In addition the first, second, third and fourth picture images can be streamed into the first, second, third and fourth memories 14, 16, 18 and 20 by pixel in a pipeline fashion.

Continuing to refer to FIG. 1, there is no data that is transferred between the memories 14, 16, 18 and 20, or between the CPU's 15, 17, 19 and 20; therefore, the respective pairs of memory and CPU 14 and 15, 16 and 17, 18 and 19, and 20 and 21 operate in parallel independent of each other. This allows the computational time on a picture image in the computation unit 13 to be performed in $1/N=\frac{1}{4}$ of the time that it takes to process the picture image data using a single processor, where N=the number of memory and CPU pairs. There is no fundamental limit to the number of memory and CPU pairs and a number of processors greater than 4 is within the scope of the present invention. For a number N>4 of memory and CPU pairs to be effective, the picture image captured by the MUT 10 needs to be portioned into N equal portions that can be run simultaneous in the N>4 memory and CPU pairs. It should be noted that fewer than four processors can be used, and the processors can operate on more than one portion.

Figure 2:
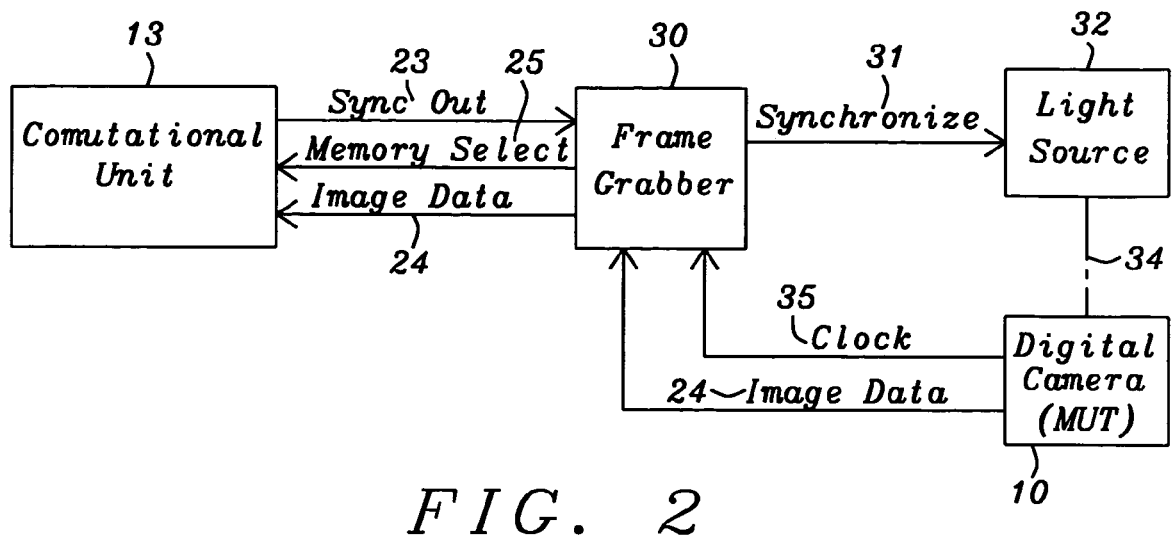
FIG. 2 is a block diagram of the interaction of a frame grabber with the parallel processor memory, the light source and the digital camera module of the present invention.

In FIG. 2 is a block diagram showing the synchronization by a frame grabber 30 for the capturing of a digital image and storing of the image in the memory of a computational unit 13 (FIG. 1). The frame grabber 30 first synchronizes 31 a light source 32, which produces a selected light 34 that is focused on the MUT 10, with a clock 35 of the MUT 10 to capture a digital picture image. The resulting image data 24 is then stored in the memory of the computational unit 13 by the frame grabber 30. The frame grabber using memory select 25 selects the computational memory 14, 16 18, and 20 (FIG. 1) and synchronizes the image data 24 with the sync out signal 23 (FIG. 1) of each memory to load a portion of the image data 24 into each of the computational memories 14, 16, 18, and 20 (FIG. 1) such that each memory 14, 16, 18, 20 contains a different portion of the image data.

Figure 3A:
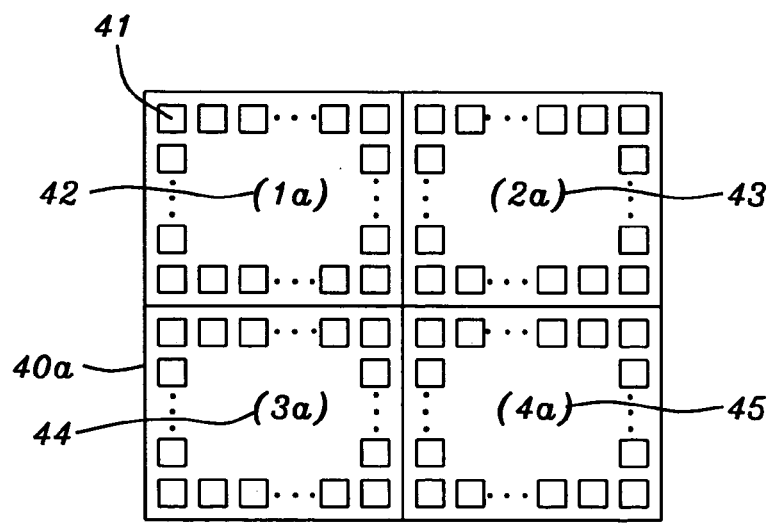
FIG. 3A through 3C are diagrams of a portioned digital picture image of the present invention.
Figure 3B:
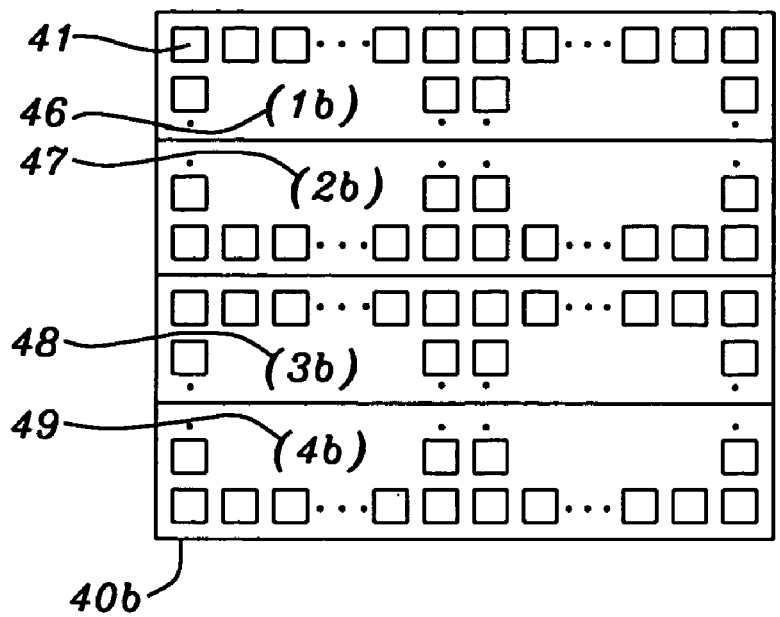
Figure 3C:
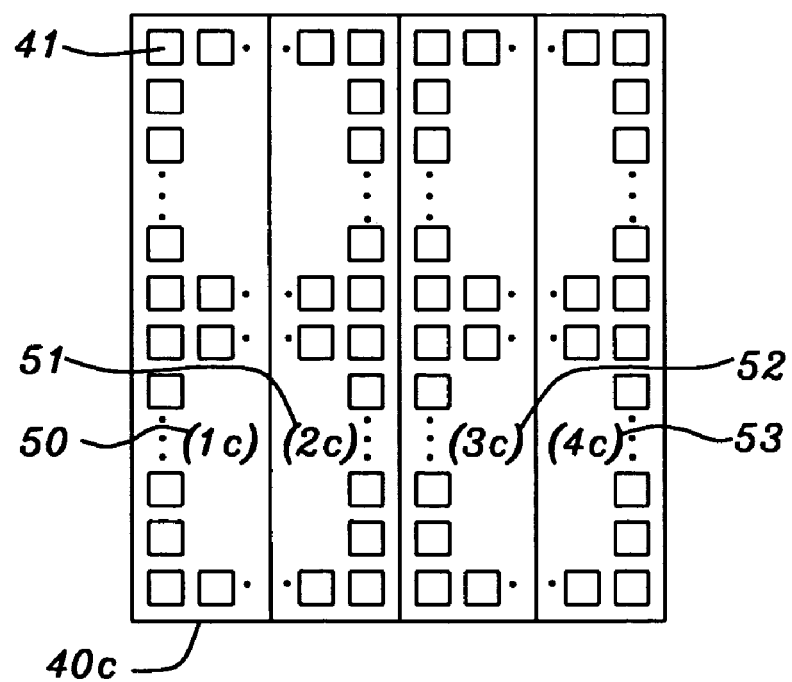

In FIG. 3A is shown a preferred digital picture image 40a containing pixels 41 in rows and columns in which the image is partitioned into portions (1a) 42, (2a) 43, (3a) 44 and (4a) 45 that occupy the corner quadrants of the image 40a. A second partition of a digital picture image 40b is shown in FIG. 3B in which the portions (1b) 46, (2b) 47, (3b) 48 and (4b) 49 are divided into rows of pixels 41. A third partition of a digital picture image 40c is shown in FIG. 3C in which the portions (1c) 50, (2c) 51, (3c) 52 and (4c) 53 are divided into columns of pixels 41. It is within the scope of the present invention that other partitions to can create portions of the image data 24 comprising diagonal partitions and partitions of concentric circles that are used to provide image data to the computational unit 13 (FIG. 1). Also the number of partitions, which create portions, is directly related to the number of CPU 15, 17, 19 and 21 (FIG. 1). If there are additional CPU (CPU>4) in the computational unit than shown in FIG. 1, the number of portions will increase to equal the number of CPU. Similar, if there are fewer CPU (CPU<4) in the number of portions will decrease to equal the number of CPU. It is also within the scope of the present invention that each CPU 15, 17, 19 and 21 (FIG. 1) operates on more than one portion.

Figure 4:
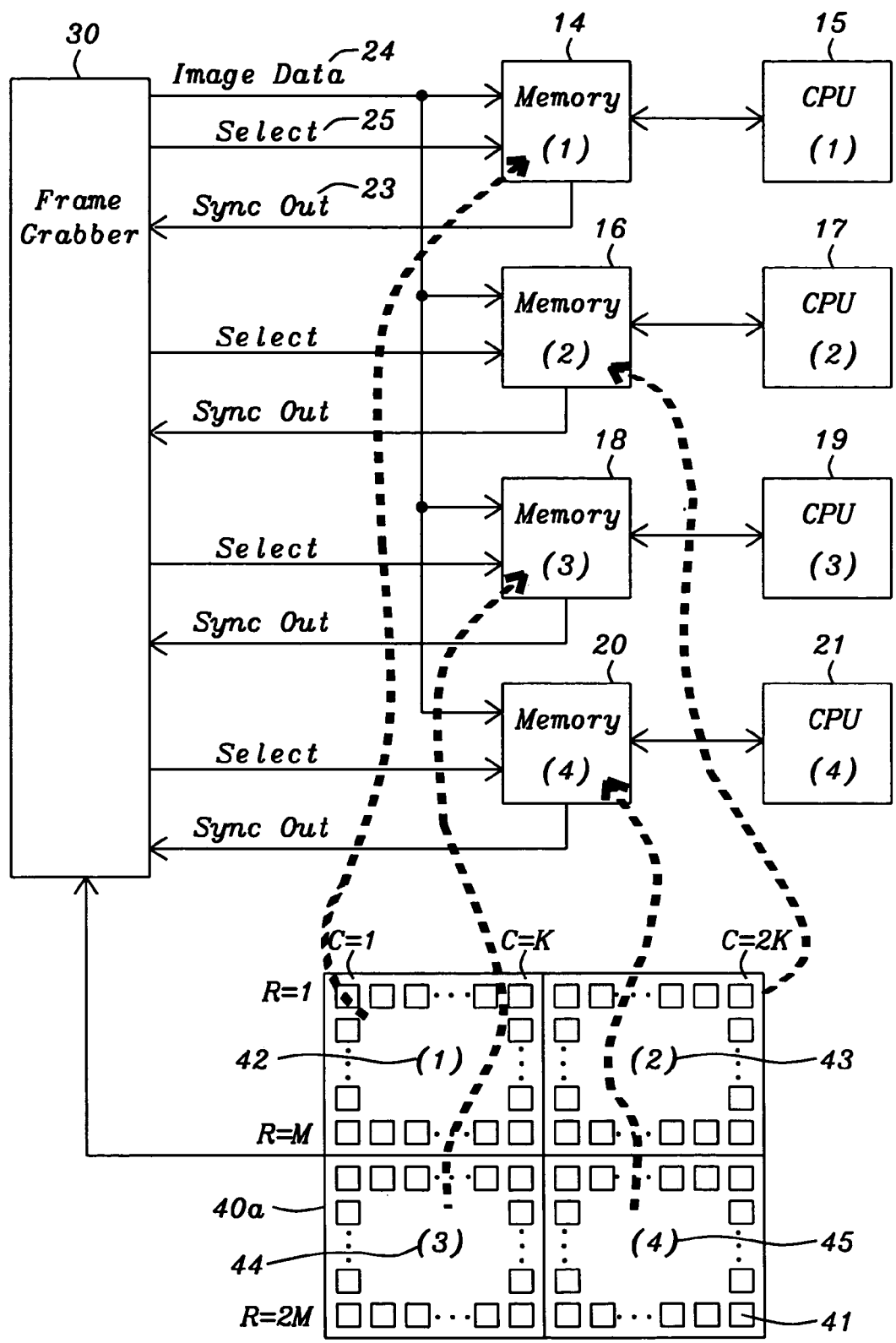
FIG. 4 is a block diagram of the present invention showing the storing of picture portions by the frame grabber.

In FIG. 4 is a diagram exemplifying the coupling by the frame grabber of portions 42, 43, 44, and 45 of a digital picture image 40a to the memories 14, 16, 18 and 20 of the computational unit 13. The digital picture image 40a comprises rows of pixels 41 from $1 \leq R \leq 2M$ and columns of pixels 41 from $1 \leq C \leq 2K$, where R is a row of pixels and C is a column of pixels. The frame grabber 30 scanning rows of the digital picture image from C=1 to C=2K selects memory (1) 14 and stores a first row R=1 of pixel 41 data from $1 \leq C \leq K$ within quadrant (1) 42 into memory (1) 14 by synchronizing the image data 24 within the quadrant (1) with the sync out 23 of memory (1) 14. Then for columns of pixels $K+1 \leq C \leq 2K$ in quadrant (2) 43, the frame grabber stores the remainder of the first row R=1 of pixel 41 data into memory (2) 16 using the select signal 25 and sync out signal 23 of the memory (2) 16. Then the first part of the next row R=2 of pixel 41 data for columns $1 \leq C \leq K$ is stored into memory (1) using the select 25 and sync out 23 signals connected to memory (1) 14. At the boundary between portion (1) and portion (2), the frame grabber selects 25 memory (2) 16 and stores the remainder of row R=2 of pixel 41 data for columns $K+1 \leq C \leq 2K$ into memory (2) 16 using the sync out 23 of memory (2). This alternate storing of a first part of a row R=M for columns $1 \leq C \leq K$ of pixel 41 data first into memory (1) 14 and then the second part of the row R=M of pixel 41 data for columns $K+1 \leq C \leq 2K$ into memory (2) 16 continues until all of the pixel data in quadrant (1) 42 and quadrant (2) 43 have been stored. Then the frame grabber stores rows $M+1 \leq R \leq 2M$ of pixel 41 data into Memory (3) 44 and memory (4) 45 in a similar fashion.

Continuing to refer to FIG. 4, the frame grabber 30 selects memory (3) 18 upon completion of the storing of pixel data into memory (1) 14 and memory (2) 16 and stores a row R=M+1 of pixel 41 data for columns $1 \leq C \leq K$ within quadrant (3) 44 into memory (3) 18 by synchronizing the data within the quadrant (3) with the sync out 23 of memory (3) 18. At the boundary between quadrant (3) 44 and quadrant (4) 45, the frame grabber stores the remainder of the row R=M+1 of pixel 41 data for columns $K+1 \leq C \leq 2K$ into memory (4) 20 using the select 25 and sync out 23 signals of the memory (4) 20. Then the first part of the row R=M+2 of pixel 41 data for columns $1 \leq C \leq K$ is stored into memory (3) 18 using the select 25 and sync out 23 signals connected to memory (3). At the boundary between portion (3) 44 and portion (4) 45, the frame grabber 30 selects 25 memory (4) 20 and stores the remainder of the row R=M+2 of pixel 41 data for columns $K+1 \leq C \leq 2K$ into memory (4) 20 using the sync out 23 of memory (4). This alternate storing of a first part of a row $M+1 \geq R \geq 2M$ of pixel 41 data for columns $1 \leq C \leq K$ first into memory (3) 18 and then the second part of the row $M+1 \geq R \geq 2M$ of pixel 41 data for columns $K+1 \leq C \leq 2K$ into memory (4) 20 continues until all of the pixel data in quadrant (3) 44 and quadrant (4) 45 has been stored. Upon completion of the storing of the image data 24 into memories 14, 16, 18 and 20, the parallel processors 15, 17, 19 and 20 operate in parallel on the data independently of each other to compute image parameters of the digital picture image 40a, which reduces the computation time by $1/N=\frac{1}{4}$ for the computational unit 13 shown in FIG. 1 as compared to the time required to perform the computation by a single processor. It should be noted that the scan of the pixel data can be scanned in the reverse direction for each row by column from C=2k to C=2K for columns $2K \geq C \geq 1$ where the image data from $2K \geq C \geq K+1$ is stored into memory (2) 16, then the image data for columns $K \geq C \geq 1$ is stored into memory (1) 14 for rows $1 \leq R \leq M$, and then image data for columns $2K \geq C \geq K+1$ is stored into memory (4) 20 and image data from $K \geq C \geq 1$ is stored into memory (3) 18 for rows $M+1 \leq R \leq 2M$.

Continuing to refer to FIG. 4, an alternative method for loading the memories 14, 16, 18 and 20 with image data 24 is to store all image data for a first memory before storing any image data for a second memory. This is done by scanning out of the MUT 10 (FIG. 2) image data containing pixel 41 data by rows $1 \leq R \leq M$ for columns $1 \leq C \leq K$ and storing the image data 24 into memory (1) 14 using the frame grabber to select 25 memory (1) and synchronize the pixel data with the memory (1) using sync out 23. Then scan out of the MUT 10 image data containing pixels 41 by rows $1 \leq R \leq M$ for columns $K+1 \leq C \leq 2K$ and storing the pixel data into memory (2) 16 using the frame grabber to select 25 memory (2) and synchronize the image data with the memory (2) using sync out 23. Next, scanned out of the MUT 10 (FIG. 2) image data containing pixel 41 data by rows $M+1 \leq R \leq 2M$ for columns $1 \leq C \leq K$ and storing the pixel data into memory (3) 18 using the frame grabber to select 25 memory (3) and synchronize the image data with the memory (3) using sync out 23. Then scan out of the MUT 10 image data 24 containing pixel 41 data by row $M+1 \leq R \leq 2M$ for columns $K+1 \leq C \leq 2K$ and storing the image data into memory (4) 20 using the frame grabber to select 25 memory (4) and synchronize the image data with the memory (4) using sync out 23. It should be noted that the image data can be scanned out in reverse order by row for columns from $C=2K$ to $C=1$. Also the image data can be scan out in reverse order of rows from $R=2M$ to $R=1$ for columns in either order $C=1$ to $C=2K$ or $C=2K$ to $C=1$.

Figure 5:
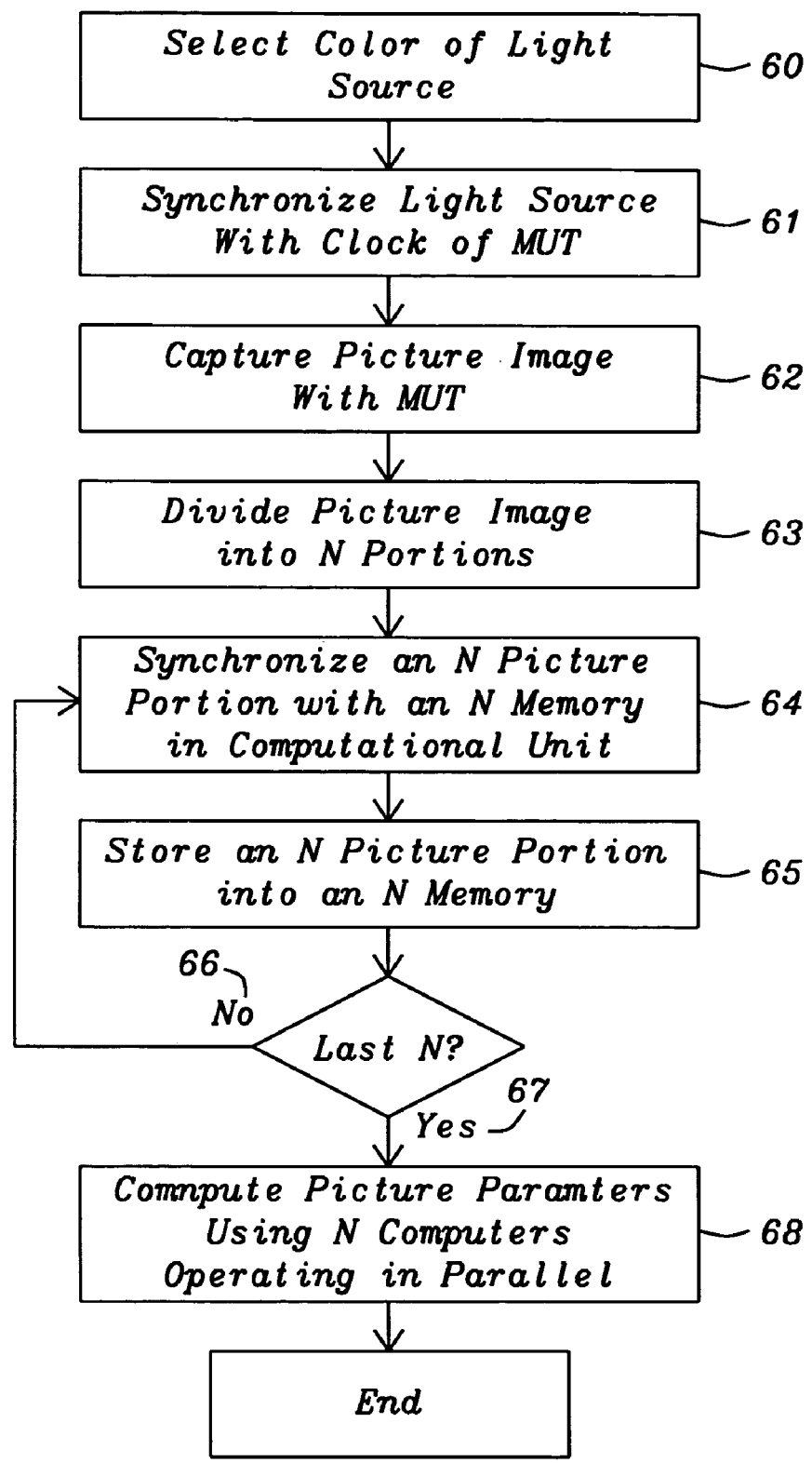
FIG. 5 is a flow diagram of the present invention for synchronizing the taking of a digital picture and storing picture portions into N independent memories.

A flow diagram in FIG. 5 demonstrates the method to capture an image from a digital camera module (MUT) 10 (FIG. 1) and couple that image to a computer processing unit 13 for computing the image parameters in a plurality of image portions where each portion is computed separately by a processor operating in parallel with other processors operating separately on the image portions. A light color in a light source is selected 60. A frame grabber synchronizes the light source having a fast turn-on and turn-off in the order of microseconds with the clock of the MUT 61 so that the time occurrence of the light and the time occurrence of the capture of the image 62 of the light are concurrent. The frame grabber divides the image into N portions 63, where N is an integer. Pixel data of a first image portion of the N image portions is synchronized with a first memory of N separate memories in a computational unit 64 by the frame grabber, and then the pixel data of the first image portion is stored into a first memory of N memories 65. Then pixel data of a second image portion of the N image portions is synchronized with a second memory of N separate memories in a computational unit 64 by the frame grabber, and then the pixel data of the second image portion is stored into a second memory of N memories 65. If N is not the last N 66, the process is repeated until all pixel data of the N portions are stored into the N memories 67, each time using the frame grabber to synchronize the data with the sync out signal the N memory. After all pixel data of the image portions are stored into the N memories, then a first processor of N processors, computes image parameters for a first image portion stored in a first memory of the N memories in parallel with a second processor computing image parameters for a second image data in a second memory in parallel with the remaining N−2 processors computing image parameters separately for the remaining N−2 image data portions located in the remaining N−2 memories 68.

While the invention has been particularly shown and described with reference to preferred embodiments thereof, it will be understood by those skilled in the art that various changes in form and details may be made without departing from the spirit and scope of the invention.

What is claimed is:

1. A computational unit for processing image data from a digital camera module under test, comprising:
   a) N portions of a digital image captured by a digital camera module under test (MUT) containing a plurality of rows and a plurality of columns of pixels, where N is an integer number,
   b) a frame grabber,
   c) N memories,
   d) N computer processing units (CPU),
   e) said frame grabber synchronizes an illumination of said MUT with a clock of said MUT, captures said digital image and synchronizes said N portions of the digital image with said N memories and stores an Nth portion of said N portions in an Nth memory of said N memories, where Nth is a ranking of all numbers represented by said integer number N,
   f) said Nth memory of said N memories coupled to an Nth CPU of said N CPU,
   g) said N CPU computes simultaneously image parameters of said N portions to evaluate a capability of said MUT to capture said illumination.

2. The computational unit of claim 1, wherein N=4.

3. The computational unit of claim 2, wherein said N portions are quadrants of a said digital image.

4. The computational unit of claim 1, wherein said N portions comprise rows of said pixels.

5. The computational unit of claim 1, wherein said N portions comprise columns of said pixels.

6. The computational unit of claim 1, wherein said frame grabber synchronizes a first portion of said N portions with a first memory of said N memories and stores said first portion into said first memory.

7. The computational unit of claim 1, wherein said frame grabber synchronizes a second portion of said N portions with a second memory of said N memories and store said second portion into said second memory.

8. The computational unit of claim 1, wherein said frame grabber synchronizes an Nth portion of said N portions with the Nth memory of said N memories and stores said Nth portion into said Nth memory.

9. The computational unit of claim 1, wherein said frame grabber stores image data into said memories by rows in an order from a first column of said plurality of columns to a last column.

10. The computational unit of claim 1, wherein said frame grabber stores image data into said memories by rows in an order from a last column of said plurality of columns to a first column.

11. The computational unit of claim 1, wherein said frame grabber stores image data into said memories by columns in an order from a first row of said plurality of rows to a last row.

12. The computational unit of claim 1, wherein said frame grabber stores image data into said memories by columns in an order from a last row of said plurality of rows to a first row.

13. The computational unit of claim 1, wherein said N portions stored into said N memories are separate and independent of each other.

14. The computational unit of claim 13, wherein said Nth CPU of the N CPU computes image parameters of the Nth portion of said N portions stored in the Nth memory of said N memories.

15. The computational unit of claim 14, wherein the N CPU operate in parallel to reduce a computation time to t/N, where t is a time required to compute an entire image on one of said CPU.

16. A method of collecting and computing parameters of a digital picture image captured during test of a digital camera module, comprising:
   a) selecting a light color,
   b) synchronizing a pulse of said light color with a clock of a digital camera module (MUT),
   c) capturing an image of said light color with said MUT, where said image contains rows and columns of pixels,
   d) dividing said image into N portions, where N an integer,
   e) storing an Nth portion of said N portions into an Nth memory of N memories, where Nth is a ranking of all numbers represented by said integer number N f) computing image parameters for said N portions with N processors to determine a capability of said MUT to capture said light color.

17. The method of claim 16, wherein N=4.

18. The method of claim 16, wherein synchronizing said pulse of the light color with said clock of the MUT is controlled by a frame grabber.

19. The method of claim 16, wherein said pulse of light color is in an order of microseconds.

20. The method of claim 16, wherein capturing said image of said light color with the MUT requires said light color pulse to be concurrent in time with capturing said image with the MUT.

21. The method of claim 16, wherein dividing said image into N portions is controlled by a frame grabber.

22. The method of claim 21, wherein dividing said image into N portions is controlled by said frame grabber to produce N equal portions.

23. The method of claim 21, where N=4 and said N portions are quadrants of said image.

24. The method of claim 16, wherein storing said Nth portion into said Nth memory is controlled by a frame grabber.

25. The method of claim 24, wherein said frame grabber synchronizes the Nth portion with a sync out signal of the Nth memory.

26. The method of claim 24, wherein storing said Nth portion into said Nth memory is controlled by said frame grabber to be by row of said pixels from a first pixel to a last pixel in the row of said Nth portion.

27. The method of claim 24, wherein storing said Nth portion into said Nth memory is controlled by said frame grabber to be by row of said pixels from a last pixel to a first pixel in the row of said Nth portion.

28. The method of claim 24, wherein storing said Nth portion into said Nth memory is controlled by said frame grabber to be by column of said pixels from a first pixel to a last pixel in the column of said Nth portion.

29. The method of claim 24, wherein storing said Nth portion into said Nth memory is controlled by said frame grabber to be by column of said pixels from a last pixel to a first pixel in the column of said Nth portion.

30. The method of claim 16, wherein, computing said image parameters of each portion of said N portions are separate and computationally independent from each other portion of said N portions.

31. The method of claim 30, wherein computing said image parameters is done with said N processors operating independent and in parallel.

32. The method of claim 31, wherein computing said image parameters with the N processors operating independent on N portions simultaneously in parallel reduces a computation time to t/N, where "t" is the time required to compute said parameters of an entire image using one processor.

33. A means for testing a digital camera module, comprising:
   a) a means for synchronizing an illumination from a light pulse source with of a digital camera module under test (MUT).
   b) a means for dividing an image of said illumination into portions,
   c) a means for coupling said portions of the image to a plurality of memories,
   d) a means for computing image parameters of said image with a plurality of processors coupled to said plurality of memories.

34. The means of claim 33, wherein said illumination is synchronized with a clock of said MUT by a frame grabber.

35. The means of claim 33, wherein the means for computing image parameters is performed by a plurality of processors coupled to said plurality of memories to evaluate a capability of said MUT to capture said illumination.

* * * * *